United States Patent [19]

Fowler

[11] 4,257,538
[45] Mar. 24, 1981

[54] LIQUID DISPENSER

[76] Inventor: John H. Fowler, 5961 Prather Dr., Fort Myers, Fla. 33907

[21] Appl. No.: 958,734

[22] Filed: Nov. 8, 1978

[51] Int. Cl.$^3$ .......................... B67D 5/06; G01F 11/28
[52] U.S. Cl. .................................... 222/181; 222/453; 222/509; 141/362; 248/645; 248/126
[58] Field of Search ................ 222/439, 440, 449–451, 222/453, 501, 509, 510, 181, 185; 248/645, 674, 126; 141/360, 362; 220/324, 326, 306

[56] References Cited

U.S. PATENT DOCUMENTS

| 1,260,334 | 3/1918 | Cordley | 222/501 |
|---|---|---|---|
| 2,129,895 | 9/1938 | Weiter | 222/453 |
| 2,216,347 | 10/1940 | Humbard | 222/449 |
| 2,457,531 | 12/1948 | Costakos | 222/440 |
| 2,631,750 | 3/1953 | Laucks | 220/326 |

Primary Examiner—H. Grant Skaggs
Attorney, Agent, or Firm—Alfred E. Wilson

[57] ABSTRACT

A liquid dispenser, for dispensing discreet amounts of a liquid, such as a mouthwash, comprised of a container for a supply of a liquid and a base member which may be attached to the container in a horizontal position to provide for a free standing condition of the assembly, or, in a vertical position for suspension from a pair of screws preset in a wall. A double acting valve, provided with a laterally extending release bar, is disposed at the bottom of the container, said valve being normally spring urged into a closing relation with a discharge port in the bottom of a dose cup, fixed relative to the bottom end of the container. When the top edge of a receptacle such as a drinking glass or paper cup is pressed upwardly against the release bar, the valve is moved from the discharge port of the dose cup permitting the liquid therein to flow into the drinking glass or other receptacle, and the valve is moved into a closing relation with a discharge port opening from the container into the dose cup. When the glass or other receptacle is removed from the release bar, the dose cup port is again closed and the container port is reopened to replenish the dose cup with a discreet amount of liquid from the container.

4 Claims, 6 Drawing Figures

U.S. Patent  Mar. 24, 1981  Sheet 1 of 2  4,257,538
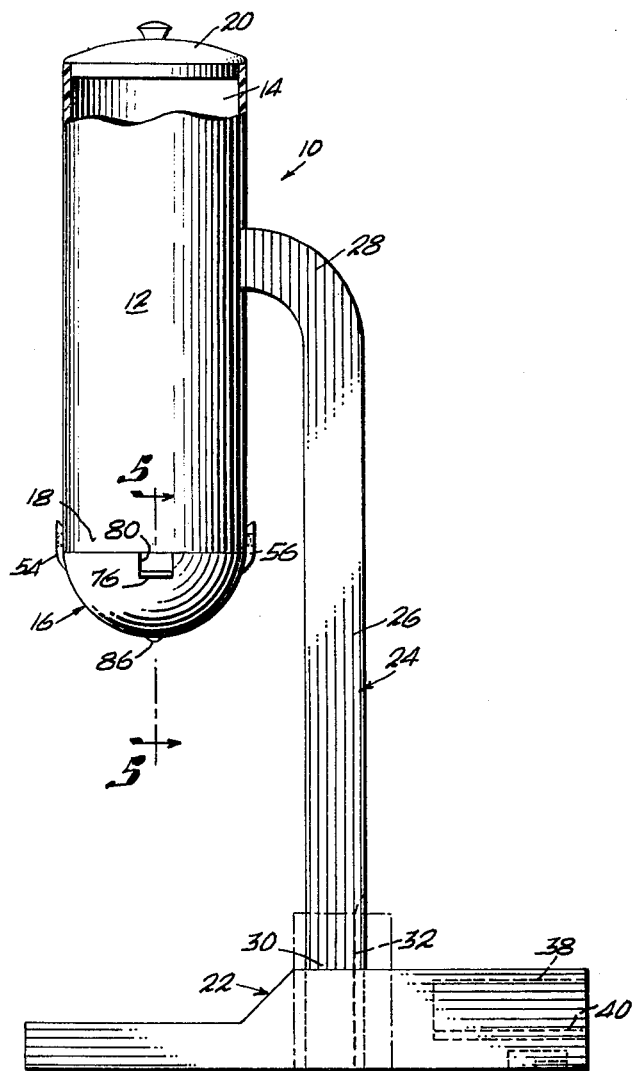
Fig.1
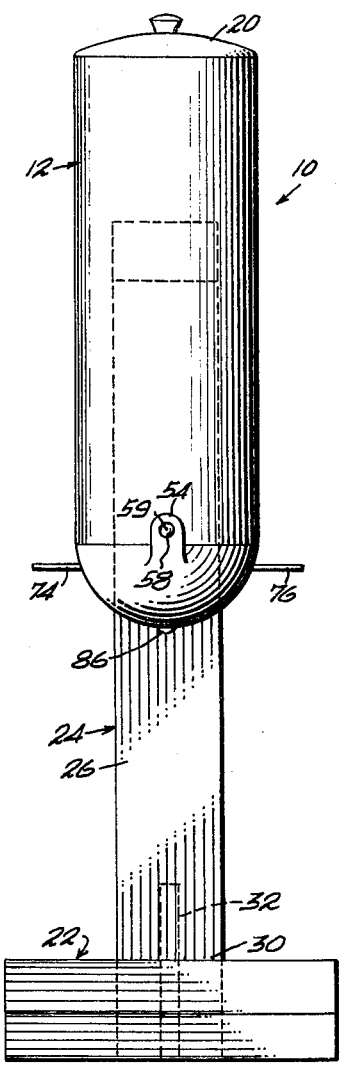
Fig.2
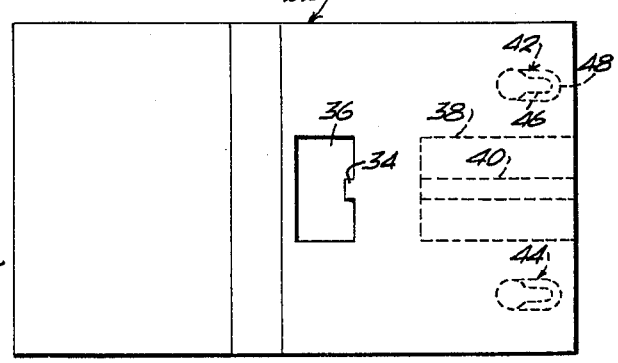
Fig.3
Fig.4

LIQUID DISPENSER

BACKGROUND OF THE PRESENT INVENTION

The present invention pertains to a liquid dispenser of a type which is adapted to discharge a discreet dose of a liquid, such as a mouthwash, into a receptacle such as a drinking glass, paper cup or the like each time that the top edge of the receptacle is pushed against a valve operating liquid release bar, and to reprime the device with a like discreet dose each time that the top edge of the receptacle is removed from engagement with the release bar.

Therefore, one of the principal objects of the invention is to provide a liquid dispenser which may be in the nature of a free standing or wall mounted device to dispense a discreet amount of a liquid such as a mouthwash each time that a spring loaded fluid release bar associated therewith is depressed as by the top edge of an appropriate receptacle such as an ordinary drinking glass or paper cup for example.

Another object of the invention is to provide a dose cup mounted at the bottom of a container, filled with the liquid to be dispensed, and a double acting valve means, fixed to the release bar, which operates to open a post in the bottom of the dose cup to discharge fluid therein into the receptacle each time that the release bar is depressed against the action of the spring loading, while simultaneously closing a discharge port in the bottom of the container.

A still further object of the invention is to provide the liquid dispenser as above described in which the double acting valve seals the dose cup port and opens the discharge port from the container when the release bar returns to its normal position after removal of the receptacle from the release bar.

Yet another object of the invention is to position the discharge post from the container, at a predetermined level within the dose cup to determine the amount of said dose.

BRIEF DESCRIPTION OF THE DRAWINGS

FIG. 1 is a side elevational view of the liquid dispenser of the present invention;

FIG. 2 is a front elevational view thereof;

FIG. 3 is a top plan view of the base member or support for the liquid dispenser;

FIG. 4 is a fragementary back view of one corner portion of the base illustrating one wall mounting aperture therein;

DESCRIPTION OF A PREFERRED EMBODIMENT

Figure 5:
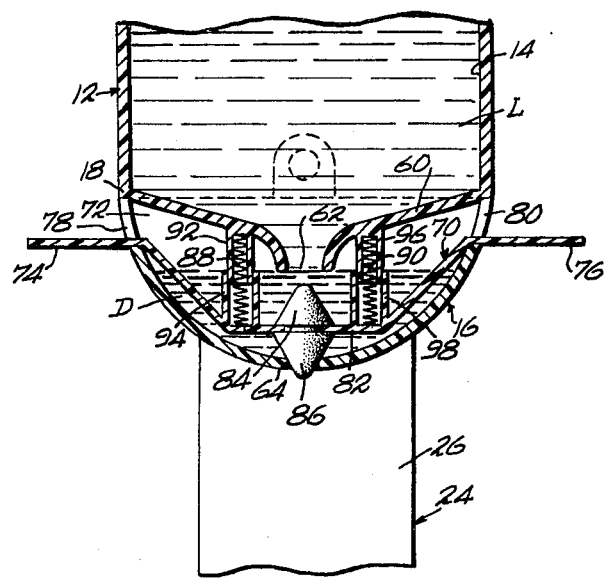
FIG. 5 is an enlarged fragmentary cross sectional view taken along line 5—5 of FIG. 1 illustrating the double acting valve in a first position.

With reference to the drawings in which like reference characters designate like or corresponding parts throughout the various views, and with particular reference to FIGS. 1 and 2, the fluid dispenser device of the present invention, indicated generally at 10, includes a container 12 to receive a supply of a liquid such as a mouthwash in an interior chamber 14 thereof, a dose cup 16, fixed to the bottom end 18 thereof, a top lid 20, a base member 22 and a support post 24 connecting between base member 22 and the container 12.

Support post 24 includes a main vertical length 26 with a curved top neck 28 connecting to the container 12. A lower end portion 30 of post 24 includes a spline 32 for reception of a stabalizing key 34 formed in a central hole 36 in the base member 22 as seen in FIGS. 1 and 3 to form a free standing structure as illustrated in full lines in FIG. 1. A second hole 38 with a key 40 is formed through the rear side edge of the base 22 for wall mounting of the device as illustrated in dot-dash lines 22' in FIG. 1. For this purpose a pair of apertures 42, 44 are formed in the bottom face of base 22, FIGS. 3 and 4. Each aperture 42, 44 includes a keyhole surface portion 46 and an enlarged interior portion 48 for secure engagement with a screw 50 preset in a wall (not shown) Holes 34 and 38 are similar in cross section for selective secure engagement of the lower post end portion 30.

As illustrated in FIG. 1, the lid 20 is designed to provide an air tight seal with the container 12 so that the interior chamber 14 is sealed, whereupon the level of liquid in the dose cup 16 will stand at the level of the discharge port 62 from the container 12.

Dose cup 16 is removably connected to the bottom end portion 18 of container 12 by means of a pair of opposed ears 54, 56 with central holes 58 for snap engagement over a pair of bosses 59 formed on the outside surface of end portion 18. It should be recognized that other forms of snaps, clips or small screws may be used to attach the dose cup 16 to the end portion 18.

Figure 6:
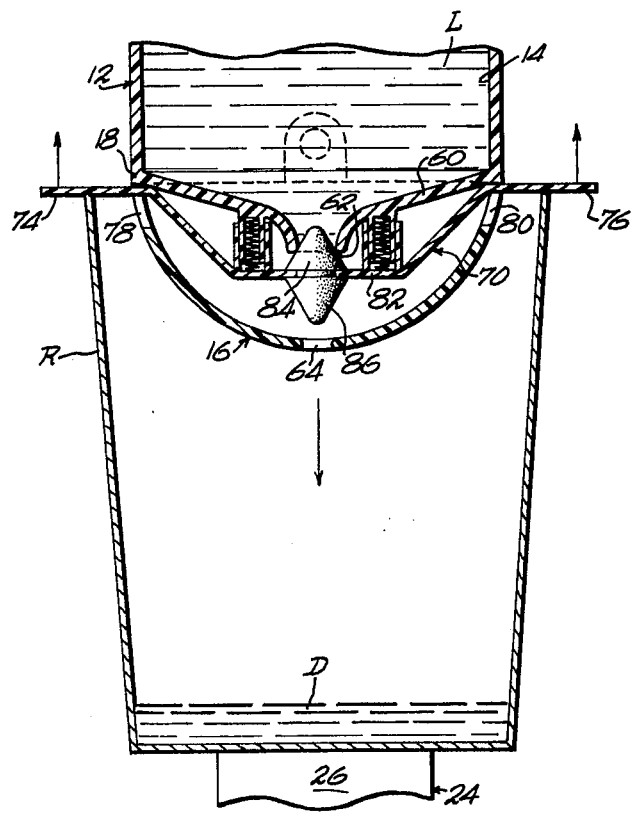
FIG. 6 is a view similar to FIG. 5 with the valve in a second position.

With particular reference to FIGS. 5 and 6, container 12 terminates at its lower end in a funnel configuration 60 with a central downwardly extended discharge port 62, spaced above, in general axial alignment with a discharge port 64 at the bottom of the generally semi-spherical dose cup 16.

A liquid release bar 70 spans the interior 72 of the dose cup 16 and includes a pair of opposed wing portions 74, 76, extending outwardly of dose cup 16 through respective slots 78, 80 in the upper periphery of said dose cup 16. A drop center portion 82 of release bar 70 includes upper and lower valve members 84, 86 in axial alignment with discharge ports 62.64.

As illustrated in FIG. 5, the release bar 70 is spring loaded at 88, 90 to a normal down position in which lower valve member 86 is in a closing relation with discharge port 64 in dose cup 16. Spring 88, 90 are disposed between respective pairs of closed and telescopic tube member 92, 94 and 96, 98, extending respectively upwardly and downwardly from release bar 70 and funnel shaped bottom portion 60. In this position, liquid L in container 12 flows into dose cup 16 until it levels off substanitally at the level of the discharge port 62 of container 12 defining a liquid dose D in cup 16. The cylinder 94 and 98 extend above the level of liquid in the dose cup 16 so that the springs are not subjected to the liquid.

When a glass or paper cup receptacle R, for example, is pushed upwardly against the release bar 70 the discharge port 64 is opened and the dose D is discharged into the receptacle R as in FIG. 6. Simultaneously, the upper valve member 84 seats in discharge port 62 of container 12 to block the discharge of liquid therefrom.

After the dose D is disposed in the receptacle R and said receptacle R is removed from engagement with the wing portion 74, 76 of release bar 70, said release bar 70 returns under spring pressure to the position of FIG. 5 and a new dose D is automatically charged into dose cup 16 to the previous level. It will, therefore, be apparent that a precise measured dose D is consistantly supplied into a receptacle upon demand. The actual volume dispensed is built into the dose cup 16 which, for example only, may provide one and one-quarter ounces of mouthwash.

I claim:

1. A liquid dispenser comprising a container including an inner chamber for the reception of a quantity of a liquid to be dispensed and having an open upper end with a removable lid, a base for supporting said container, a support post connecting between said base and container with a bottom end of said container positioned a predetermined distance above said base, a dose cup positioned beneath said bottom end, means to removably fix said dose cup relative to said bottom end, a double acting valve means, spring loaded to a normal first position and including means to move said valve means to a second position, a first discharge port in a bottom portion of said dose cup normally closed by said valve means in said first position, a second discharge port, spaced above said first discharge port, in a bottom end of said container and positioned a predetermined distance downwardly within a chamber defined in said dose cup said second port normally being open to permit a charge of liquid from said container to flow into said dose cup to a depth determined by a spaced position of said second discharge port above said dose cup bottom portion, said means to move being operable by a top edge of a receptacle, such as one of a glass and paper cup when said receptacle is positioned beneath said first discharge port and is pressed upwardly opening said valve means relative to said first discharge port to cause the charge of liquid in said dose cup to flow into said receptacle and to simultaneously close said second discharge port until the receptacle is removed whereupon said valve means returns to a normal closed relation with said first discharge port and to an open relation with said second discharge port to recharge said dose cup from said container, said double acting valve comprising a release bar including a drop center portion spanning said dose cup chamber, and lower and upper valve members fixed to said drop center portion in axial alignment respectively with said first and second ports for alternate movement into and out of closing engagement therewith.

2. The liquid dispenser defined in claim 1 wherein said means to move comprises a pair of opposed wing entensions from said release bar, extending outwardly of said dose cup through respective slots in an upper peripheral edge portion of said dose cup.

3. The liquid dispenser as defined in claim 1 and including wherein said spring loading of the double acting valve comprises a compression spring disposed between closed outer ends of each pair of at least two pairs of telescopic tube members, extending respectively upwardly and downwardly from said release bar and a bottom portion of said container.

4. The liquid dispenser as defined in claim 1 wherein the base for supporting the container is configured to provide a hole through the rear side edge of the base for reception of the support post connecting between the container and the base for reception of said post lower end, and including at least two apertures formed through a bottom face thereof, configured to engage over the head portions of a pair of screws, preset in a vertical wall to support said base in a generally vertical position.

* * * * *